(12) United States Patent
Woodcock et al.

(10) Patent No.: US 9,309,974 B1
(45) Date of Patent: Apr. 12, 2016

(54) SEALS FOR USE WITH LOW TO MEDIUM VISCOSITY FLUIDS AND RELATED METHODS, APPARATUSES AND SYSTEMS

(71) Applicant: PSI-Polymer Systems, Inc., Conover, NC (US)

(72) Inventors: David C. Woodcock, Taylorsville, NC (US); Joshua A. Bibey, Taylorsville, NC (US)

(73) Assignee: PSI-POLYMER SYSTEMS, INC., Conover, NC (US)

( * ) Notice: Subject to any disclaimer, the term of this patent is extended or adjusted under 35 U.S.C. 154(b) by 519 days.

(21) Appl. No.: 13/776,080

(22) Filed: Feb. 25, 2013

Related U.S. Application Data

(60) Provisional application No. 61/602,284, filed on Feb. 23, 2012.

(51) Int. Cl.
  *F16J 9/12* (2006.01)
  *F16J 15/32* (2006.01)

(52) U.S. Cl.
  CPC .................................. *F16J 15/3236* (2013.01)

(58) Field of Classification Search
  CPC ............ F16J 9/069; F16J 9/12; F16J 15/3236
  USPC ............ 92/159, 160, 165 R; 60/588; 277/438
  See application file for complete search history.

(56) References Cited

U.S. PATENT DOCUMENTS

| | | | | |
|---|---|---|---|---|
| 3,167,323 A * | 1/1965 | Appleton et al. | | 277/560 |
| 3,563,558 A * | 2/1971 | Doutt | | 277/438 |
| 4,174,846 A * | 11/1979 | Scott | | 277/556 |
| 4,553,761 A * | 11/1985 | Blesing et al. | | 277/553 |
| 4,565,380 A * | 1/1986 | Newman et al. | | 277/616 |
| 5,507,505 A * | 4/1996 | von-Arndt et al. | | 277/560 |
| 5,833,245 A * | 11/1998 | Gallagher | | 277/549 |
| 6,189,894 B1 * | 2/2001 | Wheeler | | 277/549 |
| 6,796,125 B2 * | 9/2004 | Kusano et al. | | 60/588 |
| 7,117,783 B2 * | 10/2006 | Ursan et al. | | 92/159 |
| 7,134,671 B2 * | 11/2006 | Duke et al. | | 277/560 |
| 8,579,298 B2 * | 11/2013 | Jinbo | | 277/559 |
| 8,678,397 B2 * | 3/2014 | Peter et al. | | 277/559 |
| 2004/0119244 A1 * | 6/2004 | Duke et al. | | 277/549 |
| 2004/0195780 A1 * | 10/2004 | Baehl et al. | | 277/549 |
| 2006/0214380 A1 * | 9/2006 | Dietle et al. | | 277/559 |
| 2006/0237916 A1 * | 10/2006 | Peter et al. | | 277/438 |
| 2007/0052181 A1 * | 3/2007 | Nakamura | | 277/584 |

* cited by examiner

*Primary Examiner* — Thomas E Lazo
(74) *Attorney, Agent, or Firm* — J. Bennett Mullinax, LLC

(57) ABSTRACT

Seals for use in machinery and apparatuses to prevent leakage of fluids and methods, apparatuses and systems related thereto are provided. The seals can be used in apparatuses that use and/or process fluids having low to medium viscosity at low or high pressures while still preventing leakage of the fluids from the apparatus during processing.

46 Claims, 8 Drawing Sheets

SEALS FOR USE WITH LOW TO MEDIUM VISCOSITY FLUIDS AND RELATED METHODS, APPARATUSES AND SYSTEMS

RELATED APPLICATIONS

The presently disclosed subject matter is based on and claims the benefit of U.S. Provisional Patent Application Ser. No. 61/602,284, filed Feb. 23, 2012; the disclosure of which is incorporated herein by reference in its entirety.

TECHNICAL FIELD

The subject matter disclosed herein relates to seals used in machinery to prevent leakage of fluids, and related methods, apparatuses and systems. In particular, the subject matter disclosed herein relates to U-seals that can be used to seal apparatuses to prevent leakage of low to medium viscosity fluids, and methods, apparatuses and systems that use such seals.

BACKGROUND

Seals, such as O-rings, are commonly used in equipment that use or process fluids. The O-rings can be used in cylindrical chambers to seal the chambers at joints or unions around an interior perimeter of the chamber. Such O-rings can be used to help seal the perimeter the container while still allowing movement of the contents of the chamber within its interior without obstruction. One type of O-ring seal that can be useful in applications that seal a moving cylinder, such as a shaft or a piston, within a bore of a housing is an O-ring with a U-shaped profile, or a U-seal. For example, U-seals are commonly used in hydraulic cylinders.

The U-Seal design can also be made to work in same applications where there is a sliding shaft or piston that has one or more cross-bores that can interact with the seal. An inherent problem lies in the bores crossing over the seals. A conventional U-seal is employed in applications where the extrusion gap (distance between the U-seal and the shaft or piston) is kept to a constant small distance along the entire surface of the cylindrical U-seal. This distance is typically a value around 0.001 inches to 0.005 inches per side or in the radial direction. If the extrusion gap of the seal is not kept to a minimum the inner lip, or arm, of the U-seal has a tendency to roll over or tear. This problem is increased significantly if a cross bore resides in the shaft or piston being sealed.

In a typical U-seal inside of a housing or bore, the fluid pressure fills the U-shaped cavity of the U-seal and applies a sealing pressure against the piston sliding across the seal keeping the fluid from leaking out of the apparatus. This is a common practice for items such as hydraulic cylinders. When the piston that has a hole, or bore, through it is sealed by the typical U-seal and that bore crosses over the seal, problems will occur. For example, the extrusion gap principle is lost and the seal no longer has a surface to ride against to keep the seal in position. Thereby, the seal is allowed to relax. When the seal is relaxed, it is allowed to protrude into the housing or bore where the seal will likely be torn or damaged when caught between the edge of the bore in the piston and the edge of the housing. For example, when the bore extends across a large portion of the seal, the sharp edges of the bore begin to slide into the exposed part of the U-Seal that is protruding into the housing, causing the seal to fail prematurely.

SUMMARY

Disclosed herein is a seal for use in an apparatus to prevent leakage of fluids from the apparatus. In some aspects, the seal comprises an integral annular body defining a space therebetween with an axis within the space and having an outer surface and an inner surface, the annular body comprising: a center base forming a first end of the annular body; an inner arm extending outward from the center base at an angle such that the inner arm extends inward toward the axis within the space defined by the annular body; an outer arm extending outward from the center base at an angle such that the outer arm extends outward away from the axis within the space defined by the annular body; a cavity formed between the inner arm and the outer arm that extends to a trough formed by the center base; and the inner arm and the outer arm having outer ends that form a second end of the annular body with the cavity having an opening at the second end, the outer end of the inner arm having a lead-in chamfer on the inner surface at the second end of the annular body and the outer end of the outer arm having a lead-in chamfer on the outer surface at the second end of the annular body.

In some aspects, the seal comprises: an integral annular body defining a space therebetween with an axis within the space and having an outer surface and an inner surface, the annular body comprising: a center base forming a first end of the annular body; an inner arm extending outward from the center base at an angle such that the inner arm extends inward toward the axis within the space defined by the annular body; an outer arm extending outward from the center base at an angle such that the outer arm extends outward away from the axis within the space defined by the annular body; the inner arm and the outer arm having outer ends that form a second end of the annular body; and a cavity formed between the inner arm and the outer arm that extends to a trough formed by the center base, the cavity comprising a base cavity section and a neck cavity section with the neck cavity section forming an opening at the second end of the annular body between the outer ends of the inner arm and the outer arm, wherein the neck cavity section comprises a width as measured between the inner arm and the outer arm that is less than a width of the base cavity section as measured between the inner arm and the outer arm.

In some aspects, the center base comprises chamfer-ends on the inner and outer surfaces at the first end of the annular body. In some aspects, the inner surface and the outer surface of the annular body are angled inward on the center base as seen in a direction from the second end towards the first end of the annular body. In some aspects, an angle of convergence of the inner surface and the outer surface on the center base as seen in a direction from the second end towards the first end of the annular body is less than an angle of divergence of the inner surface and the outer surface on the inner arm and the outer arm as seen in a direction from the first end towards the second end of the annular body. In some aspects, the outer end of the inner arm has a lead-in chamfer on the inner surface at the second end of the annular body and the outer end of the outer arm has a lead-in chamfer on the outer surface at the second end of the annular body.

In some aspects, the inner arm and the outer arm are offset from each other. In some aspects, an outer width of the annular body as measured from the first end to the second end at the outer end of the outer arm is larger than an inner width of the annular body as measured from the first end to the second end at the outer end of the inner arm. In some aspects, an inner measured length of the inner arm is shorter than an inner measured length of the outer arm as measured from the trough of the cavity to the outer ends of the respective inner and outer arms.

In some aspects, the cavity formed between the inner and outer arms has a base cavity section and a neck cavity section with the neck cavity section forming the opening at the second end of the annular body. In some aspects, the neck cavity section comprises a width as measured between the inner arm and the outer arm that is less than a width of the base cavity section as measured between the inner arm and the outer arm. In same aspects, the inner arm and the outer arm are thicker at the respective outer ends that form the neck cavity section than portions of the inner arm and the outer arm that form the base cavity section. In some aspects, a bottom of the base cavity section is formed by the trough at the center base. In some aspects, the base cavity section comprises a substantially circular cross-section. In some aspects, the inner arm and the outer arm comprise the same measured length as measured from the trough of the cavity to the outer ends of the respective inner and outer arms. In some aspects, an outer width of the annular body as measured from the first end to the second end at the outer end of the outer arm is the same as an inner width of the annular body as measured from the first end to the second end at the outer end of the inner arm.

In some aspects, the annular body comprises approximately 0.030 inches (0.762 mm) of pre-energized compression interference. In some aspects, the annular body comprises a plastic material. In some aspects, the annular body comprises at least one of a polyurethane, a polyethylene, a polytetrafluoroethylene (PTFE), a synthetic rubber or a fluoropolymer elastomer.

Also disclosed herein is an apparatus for processing fluids. In some aspects, the apparatus comprises: a housing with a bore therethrough; a piston positionable within the bore in the housing, the piston being movable within the bore of the housing; and a seal positionable within the bore of the housing between the housing and the piston, the seal comprising: an integral annular body defining a space therebetween with an axis within the space and having an outer surface and an inner surface, the annular body comprising: a center base forming a first end of the annular body; an inner arm extending outward from the center base at an angle such that the inner arm extends inward toward the axis within the space defined by the annular body; an outer arm extending outward from the center base at an angle such that the outer arm extends outward away from the axis within the space defined by the annular body; a cavity formed between the inner arm and the outer arm that extends to a trough formed by the center base; and the inner arm and the outer arm having outer ends that form a second end of the annular body with the cavity having an opening at the second end, the outer end of the inner arm having a lead-in chamfer on the inner surface at the second end of the annular body and the outer end of the outer arm having a lead-in chamfer on the outer surface at the second end of the annular body.

In some aspects, the housing further defines a circular groove that runs orthogonal to the bore, the seal being at least partially seated in the groove upon installation of the seal. In some aspects, the piston forms a cross bore therethrough. In some aspects, the cross bore comprises a large entrance bore and a small outlet bore, the large entrance bore comprising a compound radius chamfer leading to an outer surface of the piston to keep the seal inside of a groove in the housing. In some aspects, a tight clearance is formed between the piston and the bore to create a small radial extrusion gap which facilitates the sealing of the fluid within the apparatus even at low pressures. In some aspects, the radial extrusion gap is about 0.0002 inches.

In some aspects, the inner arm and the outer arm of the annular body of the seal are offset from each other. In some aspects, an outer width of the annular body as measured from the first end to the second end at the outer end of the outer arm is larger than an inner width of the annular body as measured from the first end to the second end at the outer end of the inner arm. In some aspects, an inner measured length of the inner arm is shorter than an inner measured length of the outer arm as measured from the trough of the cavity to the outer ends of the respective inner and outer arms. In some aspects, the cavity formed between the inner and outer arms have a base cavity section and a neck cavity section with the neck cavity section forming the opening at the second end of the annular body. In some aspects, the neck cavity section comprises a width as measured between the inner arm and the outer arm that is less than a width of the base cavity section as measured between the inner arm and the outer arm. In some aspects, the inner arm and the outer arm are thicker at the respective outer ends that form the neck cavity section than portions of the inner arm and the outer arm that form the base cavity section.

Also disclosed is an apparatus for processing fluids. In some aspects, the apparatus comprises: a housing with a bore therethrough; a piston positionable within the bore in the housing, the piston being movable within the bore of the housing; and a seal positionable within the bore of the housing between the housing and the piston, the seal comprising: an integral annular body defining a space therebetween with an axis within the space and having an outer surface and an inner surface, the annular body comprising: a center base forming a first end of the annular body; an inner arm extending outward from the center base at an angle such that the inner arm extends inward toward the axis within the space defined by the annular body; an outer arm extending outward from the center base at an angle such that the outer arm extends outward away from the axis within the space defined by the annular body; the inner arm and the outer arm having outer ends that form a second end of the annular body; and a cavity formed between the inner arm and the outer arm that extends to a trough formed by the center base, the cavity comprising a base cavity section and a neck cavity section with the neck cavity section forming an opening at the second end of the annular body between the outer ends of the inner arm and the outer arm, wherein the neck cavity section comprises a width as measured between the inner arm and the outer arm that is less than a width of the base cavity section as measured between the inner arm and the outer arm.

In some aspects, the housing further defines a circular groove that runs orthogonal to the bore, the seal being at least partially seated in the groove upon installation of the seal. In some aspects, the piston forms a cross bore therethrough. In some aspects, the cross bore comprises a large entrance bore and a small outlet bore, the large entrance bore comprising a compound radius chamfer leading to an outer surface of the piston to keep the seal inside of a groove in the housing. In some aspects, a tight clearance is formed between the piston and the bore to create a small radial extrusion gap which facilitates the sealing of the fluid within the apparatus even at low pressures. In some aspects, the radial extrusion gap is about 0.0002 inches. In some aspects, the outer end of the inner arm of the seal comprises a lead-in chamfer on the inner surface at the second end of the annular body and the outer end of the outer arm having a lead-in chamfer on the outer surface at the second end of the annular body. In some aspects, the inner arm and the outer arm are thicker at the respective outer ends that form the neck cavity section than portions of the inner arm and the outer arm that form the base cavity section.

It is an object of the presently disclosed subject matter to provide seals that can be used with low to medium viscosity fluids, and related methods, apparatuses, and systems. For example, seals for use in machinery to prevent leakage of fluids and methods, apparatuses and systems related thereto are provided. In some embodiments, seals are provided that can be used in apparatuses that use or process fluids to prevent leakage of the fluids therefrom even when processing fluids with a low viscosity and under a low pressure.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

An enabling disclosure of the present subject matter including the best mode thereof to one of ordinary skill in the art is set forth more particularly in the remainder of the specification, including reference to the accompanying figures, in which.

DETAILED DESCRIPTION

Figure 1:
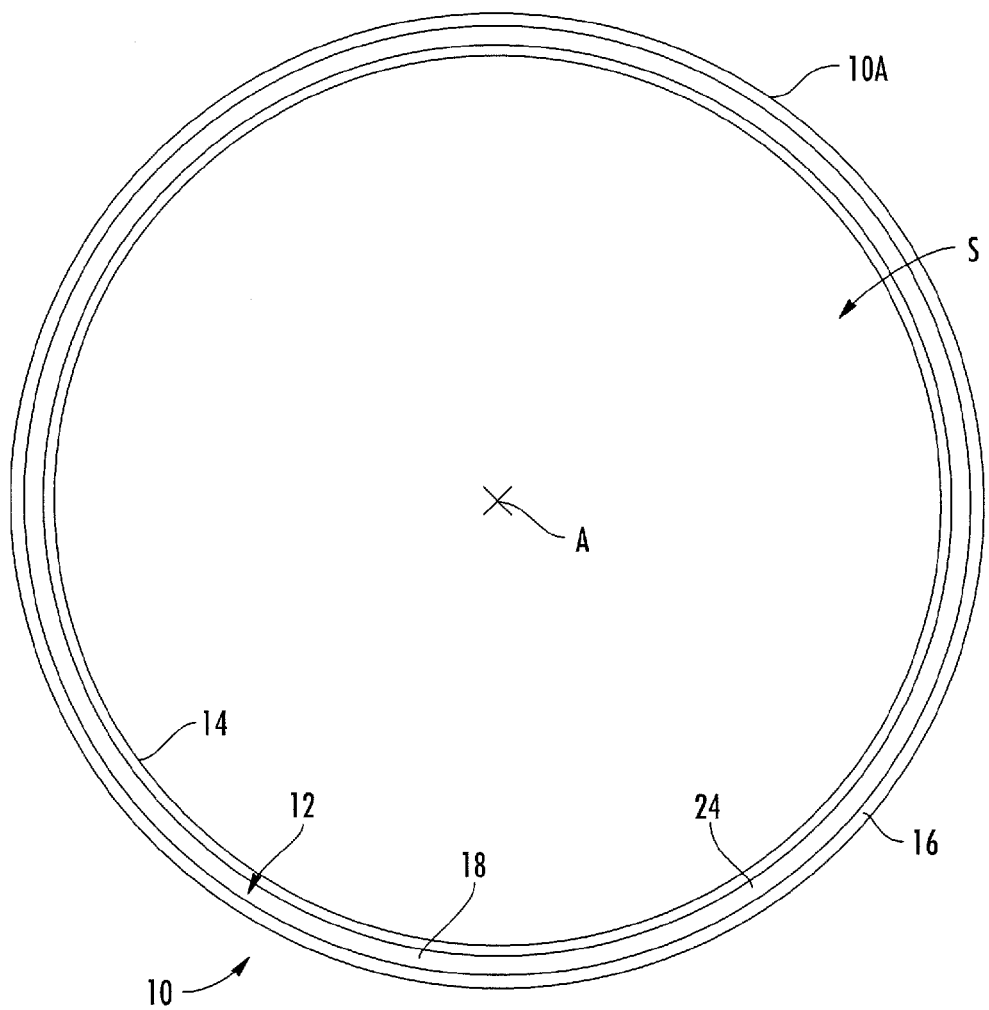
FIG. 1 is a schematic top plan view of an embodiment of a seal according to the subject matter disclosed herein.

Reference will now be made in detail to the description of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

Although the terms first, second, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure herein.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures may be schematic in nature and their shapes and/or positions are not intended to illustrate the precise configuration of a system or apparatus and are not intended to limit the scope of the subject matter disclosed herein.

Embodiments of seals for use in machinery to prevent leakage of fluids and methods, apparatuses and systems related thereto are provided herein. For example, in some embodiments, a seal for use in process machinery to prevent leakage of fluids from the machinery can comprise an integral annular body defining a space therebetween with an axis within the space and can have an outer surface and an inner surface. The integral annular body can comprise a center base forming a first end of the annular body. An inner arm can extend outward from the center base at an angle such that the inner arm extends inward toward the axis within the space defined by the annular body. An outer arm can extend outward from the center base at an angle such that the outer arm extends outward away from the axis within the space defined by the annular body. A cavity can be formed between the inner arm and the outer arm that extends to a trough formed by the center base. The inner arm and the outer arm can have outer ends that form a second end of the annular body with the cavity having an opening at the second end. The outer end of the inner arm can have a lead-in chamfer on the inner surface at the second end of the annular body, while the outer end of the outer arm can have a lead-in chamfer on the outer surface at the second end of the annular body.

In some embodiments, the center base can have chamfer-ends on the inner and outer surfaces at the first end of the annular body. In some embodiments, the inner surface and outer surface of the annular body can be angled inward on the center base as seen in a direction from the second end towards the first end of the annular body. For example, the center base can have an angle of convergence of the inner surface and the outer surface on the center base as seen in a direction from the second end towards the first end of the annular body that is less than an angle of divergence of the inner surface and the outer surface on the inner arm and the outer arm as seen in a direction from the first end towards the second end of the annular body. In some embodiments, the annular body can comprise approximately 0.030 inches (0.762 mm) of pre-energized compression interference.

In some embodiments, the inner arm and the outer arm can be offset from each other. For example, an outer width of the annular body as measured from the first end to the second end of the angular body at the outer end of the outer arm is larger than an inner width of the annular body as measured from the first end to the second end of the angular body at the outer end of the inner arm. In another example, an inner measured length of the inner arm can be shorter than an inner measured length of the outer arm as measured from the trough of the cavity to the outer ends of the respective inner and outer arms.

In some embodiments, the cavity formed between the inner and outer arms can have a base cavity section and a neck cavity section with the neck cavity section forming the opening at the second end of the annular body. In such embodiments, the outer ends of the inner and outer arms may or may not have lead-in chamfers on the inner and outer surfaces at the second end of the annular body. In such embodiments, the inner arm and the outer arm can comprise the same measured length as measured from the trough of the cavity to the outer ends of the respective inner and outer arms. For example, an outer width of the annular body as measured from the first end to the second end of the annular body at the outer end of the outer arm is the same as an inner width of the annular body as measured from the first end to the second end of the annular body at the outer end of the inner arm. In some embodiments, the neck cavity section comprises a width as measured between the inner arm and the outer arm that is less than a width of the base cavity section as measured between the inner arm and the outer arm. As such, the inner arm and the outer arm can be thicker at the respective outer ends that form the neck cavity section than portions of the inner arm and the outer arm that form the base cavity section. As stated above, a bottom of the base cavity section can also be formed by the trough at the center base. In some embodiments, the base cavity section can comprise a substantially circular cross-section.

According to the subject matter disclosed herein, the annular body can comprise a plastic material. For example, the annular body can comprise at least one of a polyurethane, a polyethylene, a polytetrafluoroethylene (PTFE), a synthetic rubber or a fluoropolymer elastomer.

According to the subject matter disclosed herein, apparatuses for processing fluids are provided in which the seals disclosed herein can be used to help prevent leakage of fluids, for example, fluids having a low viscosity. The apparatuses can comprise a housing with a bore therethrough and a piston that can be positioned within the bore in the housing. The piston can be moved within the bore of the housing during operation and maintenance of the apparatus. The apparatuses can comprise a seal similar to those described above that can be positioned within the bore of the housing between the housing and the piston. The housing can further define a circular groove that can run generally orthogonal to the bore in which the seal is partially seated upon installation of the seal. In some embodiments, the piston can form a cross bore therethrough. According to the subject matter disclosed herein, such embodiments can have a cross bore that can comprise a large entrance bore and a small outlet bore. The large entrance bore can comprise a compound radius chamfer leading to an outer surface of the piston to keep the seal inside of the groove in the housing.

In some embodiments of the apparatuses according to the subject matter disclosed herein, a tight clearance can be formed between the piston and the bore to create a small radial extrusion gap which can facilitate the sealing of the fluid within the apparatus even at low pressures. For example, the radial extrusion gap can be about 0.0002 inches.

Figure 2:
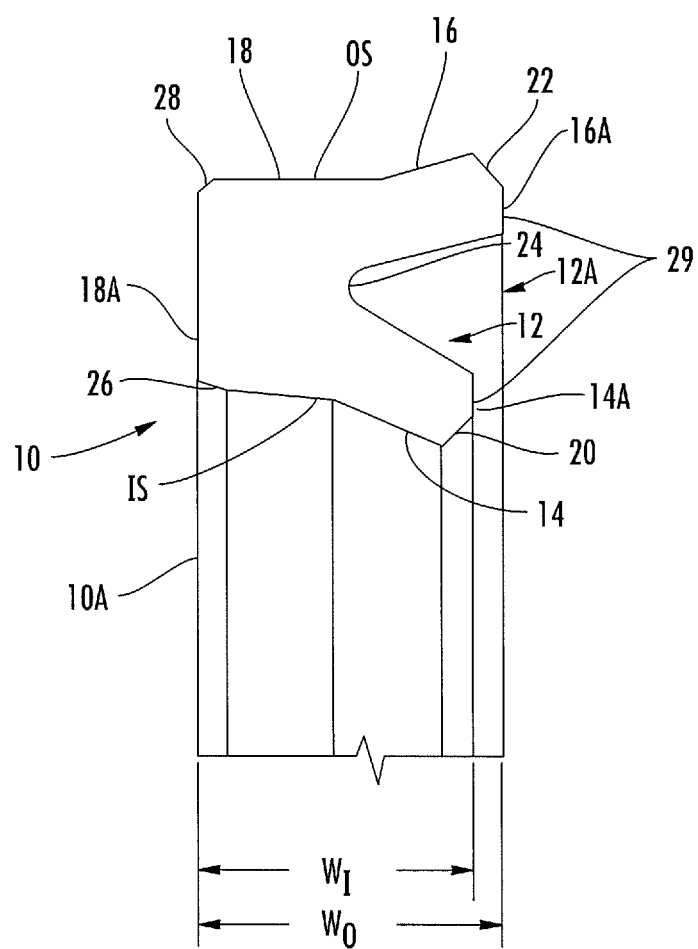
FIG. 2 is a schematic partial cross-sectional view of the embodiment of the seal according to FIG. 1.

FIGS. 1 and 2 illustrate an embodiment of a seal 10 that can be used in machinery, such as apparatuses that use or process fluids, for example, filtration apparatuses, hydraulic cylinders or diverter valves. In particular, seal 10 can comprise a U-shaped ring seal (hereinafter referred to as a "U-seal") that can comprise an integral annular body 10A that defines a spaces, generally designated S, therebetween with an axis A that passes through a center point of space S. Integral annular body 10A can have an outer surface OS and an inner surface IS. Integral annular body 10A can comprise a center base 18 forming a first end 18A of the annular body 10A. An inner arm 14 can extend outward from center base 18 at an angle such that inner arm 14 extends inward toward axis A within space S defined by annular body 10A. An outer arm 16 can extend outward from center base 18 at an angle such that outer arm 16 extends outward away from axis A within space S defined by annular body 10A. A cavity, generally designated 12, can be formed between inner arm 14 and outer arm 16 that extends to a trough 24 formed by center base 18. Inner arm 14 and outer arm 16 can have respective outer ends 14A, 16A that form a second end 29 of annular body 10A with cavity 12 having an opening, generally designated 12A, at second end 29. Outer end 14A of inner arm 14 can have a lead-in chamfer 20 on inner surface IS at second end 29 of annular body 10A and outer end 16A of outer arm 16 can have a lead-in chamfer 22 on outer surface OS at second end 29 of annular body 10A.

As stated above, U-seal 10 can have cavity 12 formed between two arms, inner arm 14 and outer arm 16, that extend outward from center base 18. Inner arm 14 and outer arm 16 can flair out at an angle from center base 18. U-seal 10 can be employed in any application where there is a sliding shaft or piston that has one or more cross-bores that will interact with U-seal 10. As shown in FIG. 2, the embodiment of seal 10 has inner arm 14 and outer arm 16 that have lead-in chamfers 20, 22 on outer lead ends 14A, 16A on the respective arms 14, 16 opposite U-shaped cavity 12.

U-Seal 10 can more easily guide itself across a bore in the piston that it is crossing as the respective piston moves. As shown in FIG. 2, an inner measured length of inner arm 14 can be shorter than an inner measured length of outer arm 16 as measured from a trough 24 of U-shaped cavity 12. It is noted, that the portions on inner and outer surfaces IS, OS of U-seal 10 where inner arm 14 and outer arm 16 flair out from center base 18, as well as inner arm 14 and outer arm 16 themselves, can be offset from each other. In this manner, outer measured lengths of both arms 14, 16 can be the same, even when inner measured lengths as measured from trough 24 of U-shaped cavity 12 of both arms 14, 16 are different. In some embodiments, the outer measured lengths of inner and outer arms 14, 16 can also be different.

By having the inner measured length of inner arm 14 shorter than the inner measured length of outer arm 16 as measured from trough 24 of U-shaped cavity 12, an outer width $W_O$ of U-seal 10 can be larger than an inner width $W_I$ of U-seal 10 as shown in FIG. 2. In this manner, inner arm 14, which when, in use, makes contact with the piston, is set back slightly from the opposing outer arm 16 of U-seal 10. Having the inner measured length of inner arm 14 shorter than the inner measured length of outer arm 16, in addition to the lead-in chamfer 20 on arm 14, helps to keep U-seal 10 from folding over or tearing when a bore crosses over U-seal 10. With such a design, U-seal 10 does not need or require an energizer, such as an O-ring or quad ring, to be inserted into U-shaped cavity 12 of U-seal 10 to add additional force for sealing at lower pressures.

As shown in FIG. 2, center base 18 of U-seal 10 can have a chamfered end 26 on inner surface IS and a chamfered-end 28 on outer surface OS. Chamfered ends 26 and 28 can facilitate the seating of U-seal 10 in a housing of an apparatus during insertion of U-seal 10 therein. Chamfered ends 26 and 28 can also facilitate the removal of U-seal 10 from the housing of the apparatus. Chamfered ends 26 and 28 can thus be useful during the replacement of U-seals within the process machinery.

Figure 3A:
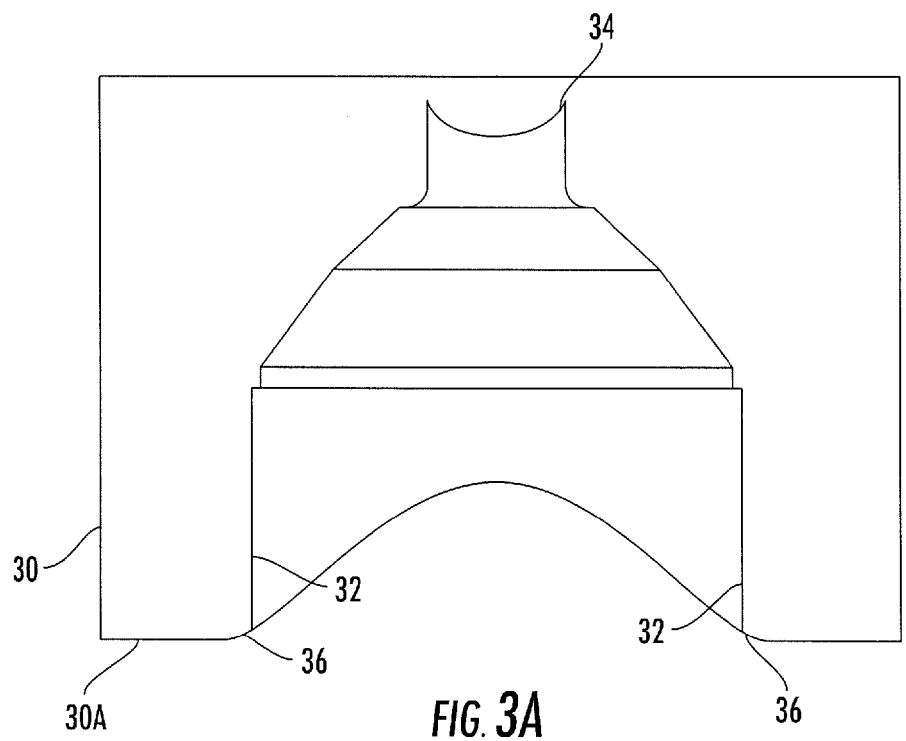
FIG. 3A shows a top view of an embodiment of a piston that can be used in an embodiment of an apparatus that uses a seal according to the present subject matter.
Figure 3B:
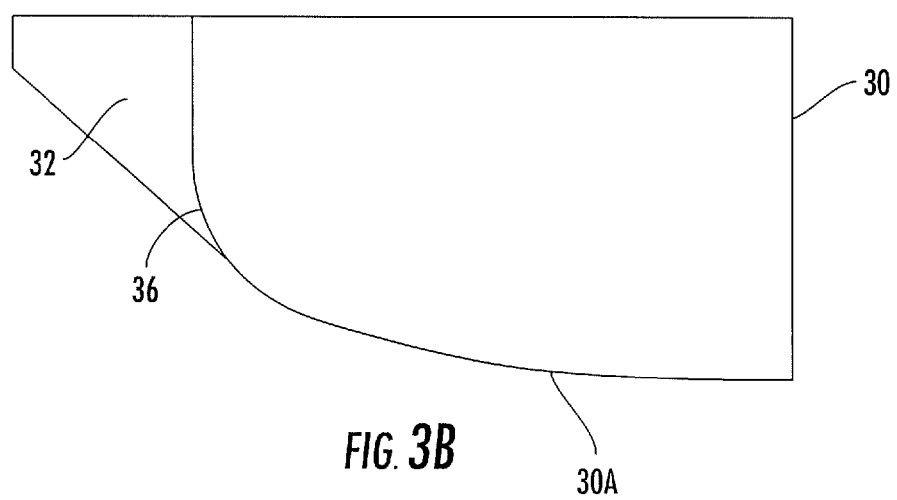
FIG. 3B shows a magnified view of a compound radius chamfer at an entrance bore of an embodiment of a piston that can be used in an embodiment of an apparatus that uses a seal according to the present subject matter.

U-seal 10 can be used in apparatuses that process fluids, for example, filtration apparatuses, hydraulic cylinders and diverter valves. In some embodiments of process machinery having pistons that can use U-seal 10, the bores in the piston can have a specific design that can increase the lifespan of the U-seal 10 being used. FIG. 3A shows a top view of a piston, generally designated 30, with a large entrance bore 32 and a small outlet bore 34 with large entrance bore 32 utilizing a compound radius chamfer 36 that leads to an outer surface 30A of piston 30 to keep a U-seal being used therewith inside of the groove in the housing of the process apparatus. A simple chamfer or radius might not work very well if the bore diameter is larger than 50% of the piston diameter itself. FIG. 3B shows a magnified view of compound radius chamfer 36 at entrance bore 32 in piston 30. Compound radius chamfer 36 can help keep the U-seal in its position in the housing of the process apparatus.

As stated above, U-seal 10 can be used in process apparatuses that process low viscosity fluids and can keep such low viscosity fluids from leaking during the processing. To facilitate the effectiveness of U-seal 10, the process apparatus can be capable of aiding in the prevention of leakage by having an extremely tight clearance between the piston and the bore. Such a U-seal 10 when used in a process apparatus that has such a tight clearance can process low viscosity fluids, for example, fluids even thinner than water at 1 centipoise, even at low pressures (i.e., less than 50 PSI). Such tight clearances can create an extremely small radial extrusion gap which can help the process apparatus seal the fluid even at low pressures and can help the U-seal last longer and avoid premature failure. This radial gap can be as small as about 0.0002 inches. Such small tolerances can, in some cases, require special machine tools and practices to achieve, especially when dealing with elevated temperatures and issues with thermal expansion.

U-seal 10 can be made from different material. For example, U-seal 10 can comprise a plastic material. For instance, U-seal 10 can comprise at least one of a polyurethane, a polyethylene, such as a polytetrafluoroethylene (PTFE), a synthetic rubber or a fluoropolymer elastomer. For example, in some embodiments, U-seal 10 can comprise a PTFE such as TEFLON® or a fluoropolymer elastomer such as VITON® both of which are sold by E. I. du Pont de Nemours and Company located in Wilmington, Del.

Figure 4:
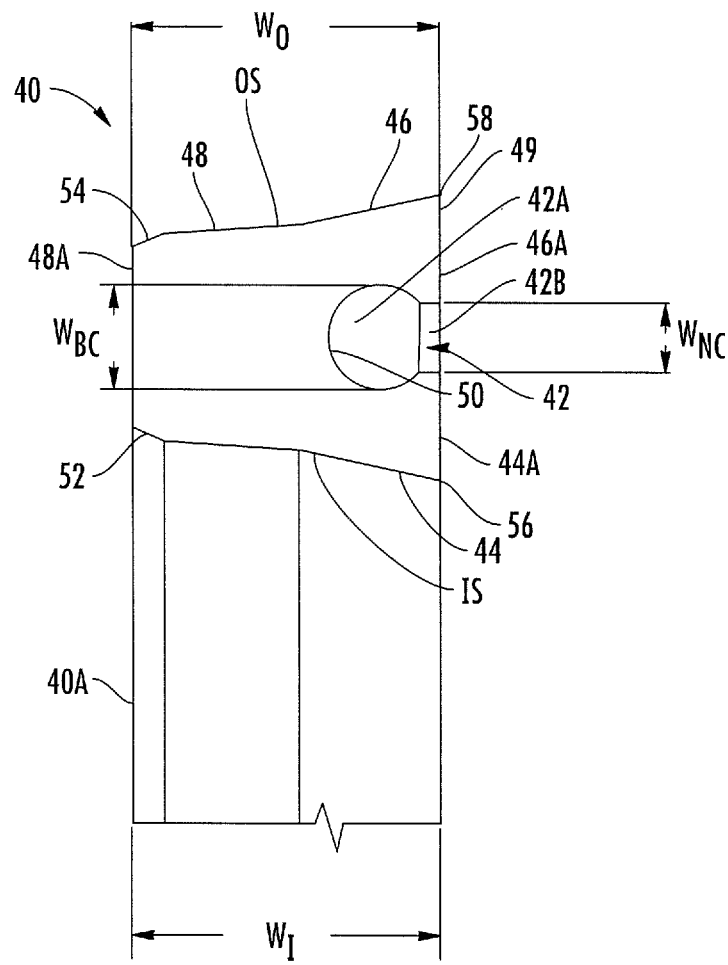
FIG. 4 is a schematic partial cross-sectional view of another embodiment of a seal according to the subject matter disclosed herein.

FIG. 4 illustrates a cross-section of another embodiment of a seal, generally designated 40, that can be used in apparatuses that use or process fluids, for example, filtration apparatuses, hydraulic cylinders and/or diverter valves. In particular, seal 40 comprises a pre-energized U-shaped ring seal (hereinafter referred to as a "U-seal"). While FIG. 4 only shows a cross-sectional portion, seal 40 can comprise an integral annular body 40A that defines a space (not shown) therebetween and has an axis (not shown) at a center point of the space. Integral annular body 40A can have an outer surface OS and an inner surface IS. Annular body 40A can comprise a center base 48 forming a first end, or rear end, 48A of annular body 40A. An inner arm 44 can extend outward from center base 48 at an angle such that inner arm 44 extends inward toward the axis within the space defined by annular body 40A. An outer arm 46 can extend outward from center base 48 at an angle such that outer arm 46 extends outward away from the axis within the space defined by the annular body 40A. Inner arm 44 and outer arm 46 can each have respective outer ends 44A, 46A that form a second end 49 of annular body 40A. A cavity 42 can be formed between inner arm 44 and outer arm 46 that can extend to a trough 50 formed by center base 48. Cavity 42 can comprise a base cavity section 42A and a neck cavity section 42B. Neck cavity section 42B can form an opening at second end 49 of annular body 40A between outer ends 44A, 46A of inner arm 44 and outer arm 46. Further, neck cavity section 42B can comprise a width $W_{NC}$ as measured between inner arm 44 and outer arm 46 that is less than a width $W_{BC}$ of base cavity section 42A as measured between inner arm 44 and outer arm 46.

Thus, as stated above, U-seal 40 can have cavity 42 formed between two arms, inner arm 44 and outer arm 46, that extend outward from center base 48. Cavity 42 can have base cavity section 42A and neck cavity section 42B. Base cavity section 42A can reside at an interior of U-seal 40 and extend to trough 50 of cavity 42. Base cavity section 42A can comprise different cross-sectional shapes. For example, base cavity section 42A can have a circular cross-section, a polygonal cross-section, an oval cross-section, or the like. In the embodiment shown in FIG. 4, base cavity section 42B comprises a cross-section that is about circular having a width $W_{BC}$. Neck cavity section 42B can reside at an outer portion of inner arm 44 and outer arm 46. Neck cavity section 42B can have a width $W_{NC}$ that is less than width $W_{BC}$ of base cavity section 42A. Thus, inner arm 44 and outer arm 46 of U-seal 40 can be thicker at outer ends 44A and 46A, respectively, that form neck cavity section 42B than the portions of inner arm 44 and outer arm 46 that for base cavity section 42A.

Inner arm 44 and outer arm 46 can flair out at an angle from center base 48 along inner surface IS and outer surface OS, respectively. Further, center base 48 can be slightly angled. For example, inner surface IS and outer surface OS can angle inward toward each other from the point where inner surface IS and outer surface OS flair outward at arms 44, 46 to first end 48A of annular body 40A. This angle of convergence of inner surface IS and outer surface OS on center base 48 looking from outer ends 44A and 46A at second end 49 of annular body 40A toward first end 48A of annular body 40A can be less than the angle of divergence of inner surface IS and outer surface OS on inner arm 44 and outer arm 46 looking from first end 48A toward second end 49 of annular body 40A. Unlike U-seal 10, inner arm 44 of U-seal 40 is not offset from outer arm 46. Thus, an outer width $W_O$ of U-seal 40 can be the same as an inner width $W_I$ of U-seal 40 as shown in FIG. 2.

As shown in FIG. 4, center base 48 of U-seal 40 can have a chamfered end 52 on inner surface IS and a chamfered-end 54 on outer surface OS. Chamfered ends 52 and 54 can facilitate the seating or removal of U-seal 40 within the housing of an apparatus, such as during the replacement of U-seals within the apparatus. Unlike on U-seal 10, outer ends 44A and 46A of U-seal 40 have sharp outer corners 56, 58 that are not beveled or chamfered. In use, such corners 56, 58 might tear during operation. However, slight tears at corners 56, 58 do not reduce the overall effectiveness on U-seal 40, as tests have shown that seals, such as U-seal 40, can operate effectively under low and high pressures without leaking for many cycles, even after corners 56, 58 are torn away. Thus, U-seal 40 can be employed in any application where there is a sliding shaft or piston that has one or more cross-bores that will interact with U-seal 40. As stated above, U-seal 40 can be pre-energized. For example, U-seal 40 can have approximately 0.030 inches (approximately 0.762 mm) of pre-energized compression interference.

Figure 5:
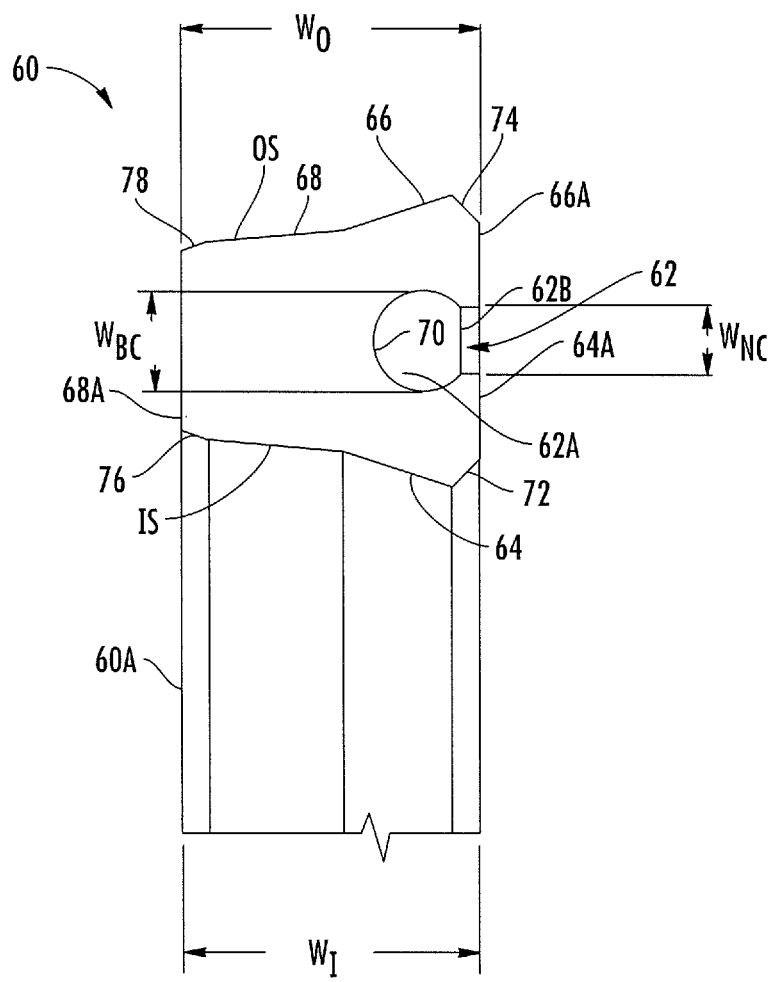
FIG. 5 is a schematic partial cross-sectional view of a further embodiment of a seal according to the subject matter disclosed herein.

FIG. 5 illustrates a cross-section view of another similar embodiment of a seal, generally designated 60, that can be used in apparatuses for using or processing fluids, for example, filtration apparatuses, hydraulic cylinders or diverter valves. In particular, seal 60 comprises a pre-energized U-shaped ring seal (hereinafter referred to as a "U-seal"). Seal 60 can comprise an integral annular body 60A that defines a space (not shown) therebetween and has an axis (not shown) at a center point of the space. As with the embodiment shown in FIG. 4, U-seal 60 in FIG. 5 can have a cavity 62 formed between two arms, inner arm 64 and outer arm 66, that extend outward from a center base 68. Cavity 62 can be U-shaped and have a base cavity section 62A and a neck cavity section 62B. Base cavity section 62A can reside at an interior of U-seal 60 and form a trough 70 of cavity 62. Base cavity section 62A can comprise different cross-sectional shapes. For example, base cavity section 62A can have a circular cross-section, a polygonal cross-section, an oval cross-section, or the like. In the embodiment shown in FIG. 5, base cavity section 62A comprises a cross-section that is about circular having a width $W_{BC}$. Neck cavity section 62B can reside at an outer portion of inner arm 64 and outer arm 66. Neck cavity section 62B can have a width $W_{NC}$ that is less than width $W_{BC}$ of base cavity section 62A. Thus, inner arm 64 and outer arm 66 of U-seal 60 can be thicker at outer ends 64A and 66A, respectively, that form neck cavity section 62B than the portions of inner arm 64 and outer arm 66 that for base cavity section 62A.

Inner arm 64 and outer arm 66 can flair out at an angle from center base 68 along inner surface IS and outer surface OS, respectively. As shown in FIG. 5, inner arm 64 and outer arm 66 can have lead-in chamfers 72, 74 on outer lead ends 64A, 66A on the respective arms 64, 66 opposite U-shaped cavity 62. Lead-in chamfers 72, 74 facilitate guidance of U-seal 60 across pockets or bores in the piston when the bores are crossing over the seal when in use.

Further, as with the embodiment shown in FIG. 4, center base 68 of U-seal 60 shown in FIG. 5 can be slightly angled. For example, inner surface IS and outer surface OS can angle inward toward each other from the point where inner surface IS and outer surface OS flair outward at arms 64, 66 to a rear end 68A of center base 68. This angle of convergence of inner surface IS and outer surface. OS on center base 68 as seen from outer ends 64A and 66A toward rear end 68A can be less than the angle of divergence of inner surface IS and outer surface OS on inner arm 64 and outer arm 66 as seen from rear end 68A toward outer ends 64A and 66A. As shown in FIG. 5, center base 68 of U-seal 60 can have a chamfered end 76 on inner surface IS and a chamfered-end 78 on outer surface OS. Chamfered ends 76 and 78 can facilitate the seating and removal of U-seal 60 within a housing of an apparatus. As stated above, U-seal 60 is pre-energized to permit it to operate at low pressures that can be zero or below (negative pressures). U-Seal 60 can more easily guide itself across a bore in the piston within a process apparatus that it is crossing as the respective piston moves. U-seal 60 can be employed in any application where there is a sliding shaft or piston that has one or more cross-bores that will interact with U-seal 60.

Figure 6:
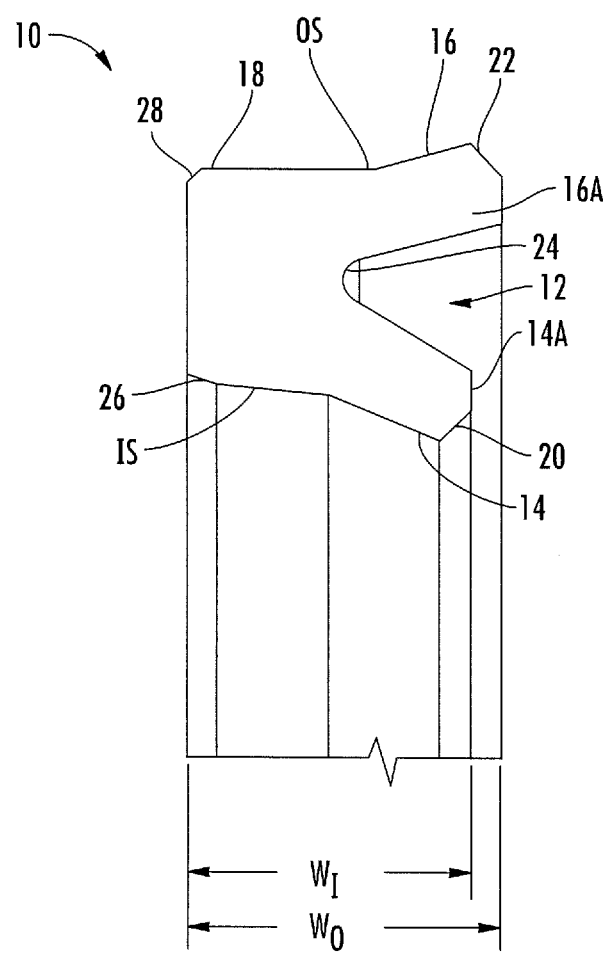
FIG. 6 is a schematic partial cross-sectional view of an embodiment of a seal according to the subject matter disclosed herein.

FIG. 6 illustrates an embodiment of a seal 10 that is the same configuration as U-seal 10 shown in FIG. 2. In particular, seal 10 comprises a U-shaped ring seal (hereinafter referred to as a "U-seal"). U-seal 10 can have a cavity 12 formed between two arms, inner arm 14 and outer arm 16 that extend outward from a center base 18. Inner arm 14 and outer arm 16 can flair out at an angle from center base 18. Center base 18 of U-seal 10 can have a chamfered end 26 on inner surface IS and a chamfered-end 28 on outer surface OS. U-seal 10 can be employed in any application where there is a sliding shaft or piston that has one or more cross-bores that will interact with U-seal 10. As shown in FIG. 2, the embodiment of seal 10 has inner arm 14 and outer arm 16 that have lead-in chamfers 20, 22 on outer lead ends 14A, 16A on the respective arms 14, 16 opposite U-shaped cavity 12. Due to the similarities with the embodiment shown in FIG. 2, U-seal 10 shown in FIG. 6 will not be described in further detail. As stated above, U-Seal 10 can more easily guide itself across a bore in the piston that it is crossing as the respective piston moves. U-seal 10 can work in any application where there is a sliding shaft or piston that has one or more cross-bores that will interact with U-seal 10. Also as above, U-seal 10 does not need or require an energizer, such as an O-ring or quad ring, to be inserted into U-shaped cavity 12 of U-seal 10 to add additional force for sealing at lower pressures.

Figure 7:
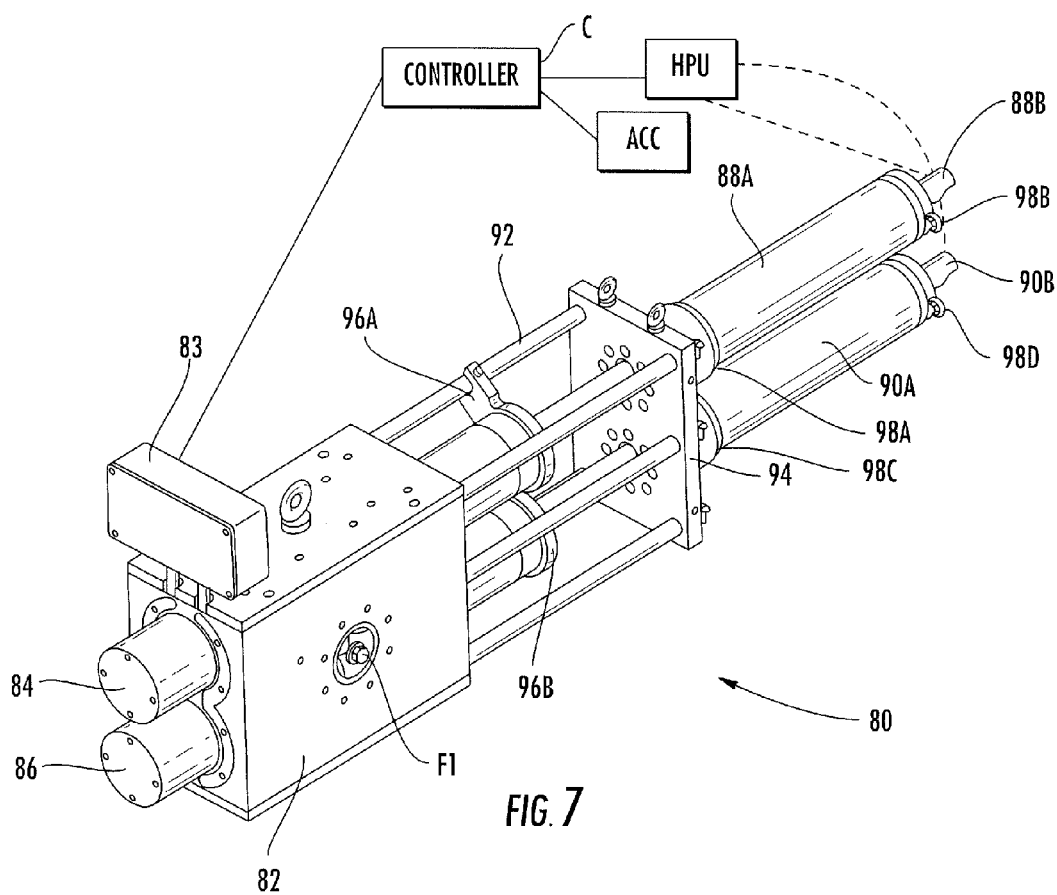
FIG. 7 is a perspective view of an embodiment of a filtration apparatus which can use embodiments of seals according to the present subject matter.

FIG. 7 illustrates one example of a process apparatus that can use embodiments of the seals 10, 40, 60 described above. In particular, FIG. 7 illustrates an embodiment of a filtration apparatus, generally designated 80, that can be use in polymer processing systems. Filtration apparatus 80 can comprise a housing 82 that can include a main supply channel F1 and a main discharge channel (not shown). The filtration apparatus 10 can also comprise one or more screen-bearing pistons. For example, as shown in FIG. 6, two screen-bearing pistons 84 and 86 can be provided in the filtration apparatus 80. Each screen-bearing piston 84, 86 can comprise one or more filter screen cavities (not shown). A portion of the main supply channel F1 can be divided into one or more supply sub-channels for directing a flow of material such a polymer to be filtered, to one or more filter screens, or screen packs (not shown) in each of the filter cavities in screening-bearing pistons 84, 86. A portion of the main discharge channel in housing 82 can also be divided into one or more discharge sub-channels for receiving a flow of material, such as polymer, from the one or more filter screens. Each screen-bearing piston 84, 86 can comprise one or more piston discharge channels that are alignable with the one or more discharge sub-channels of housing 82 to permit passage of the polymer being filtered through the filter screens and out the main discharge channel. Thus, polymer to be filtered can pass through main supply channel F1 and/or any corresponding supply sub-channels, through the filter screens in the filter screen cavities defined in screen-bearing pistons 84, 86, through the piston discharge channels and out the main discharge channel and/or any corresponding discharge sub-channels.

Filtration apparatus 80 can be controlled and/or actuated via a controller C that can be interfaced with a junction box 83 and a hydraulic power unit HPU to move pistons 84, 86 as needed. In particular, filtration apparatus 80 can generally comprises two individual hydraulic cylinders 88A and 90A. Each hydraulic cylinder 88A, 90A can be configured to actuate one slideable screen-bearing piston 84, 86, respectively. Each slideable screen-bearing piston 84, 86 can have internal linear positioning transducers generally designated 88B and 90B, which are wired into remote controller C capable of automatically actuating the filtration apparatus. For example, controller C of filtration apparatus 80 can interface with a hydraulic power unit HPU to automatically actuate and position pistons 84, 86 to different positions for different functions. A rapid accelerator device ACC can be in communication with the hydraulically operated power unit HPU and the controller C to accelerate the linear movement of the screen-bearing pistons 12, 13 to reduce disruption of the flow of polymer being processed. The rapid accelerator device ACC can be, for example, an accumulator, a variable speed pump device, or some other speed increasing device. In the embodiment shown, rapid accelerator device ACC can be considered an accumulator. While shown in the embodiment depicted in FIG. 7, an accelerator device ACC does not need to be included with apparatus 80.

Hydraulic cylinders 88A and 90A can be secured to housing 82 using an arrangement of a plurality of tie rods, generally designated 92. In particular, hydraulic cylinders 88A and 90A can be secured to a mounting plate, generally designated 94 utilizing the tie rods 92. Each of the hydraulic cylinder's reciprocating pistons (not shown) within the respective hydraulic cylinder 88A, 90A, which can be actuated with hydraulic pressure, can be secured to each of the screen-bearing pistons 84 and 86 with alignment plates 96A and 96B. Each alignment plate 96A and 96B can straddle one of the tie rods 92, allowing for proper alignment of flow bores. Each hydraulic cylinder 88A and 90A can require hydraulic pressure to actuate each of their respective pistons in both reciprocating directions. Hydraulic hoses (not shown) can typically be used to connect the hydraulic cylinders 88A and 90A to a hydraulic power unit HPU. The hydraulic hoses can be connected to the cylinders 88A and 90A at hydraulic connections 98A, 98B, 98C, and 98D, illustrated in FIG. 7.

Figure 8:
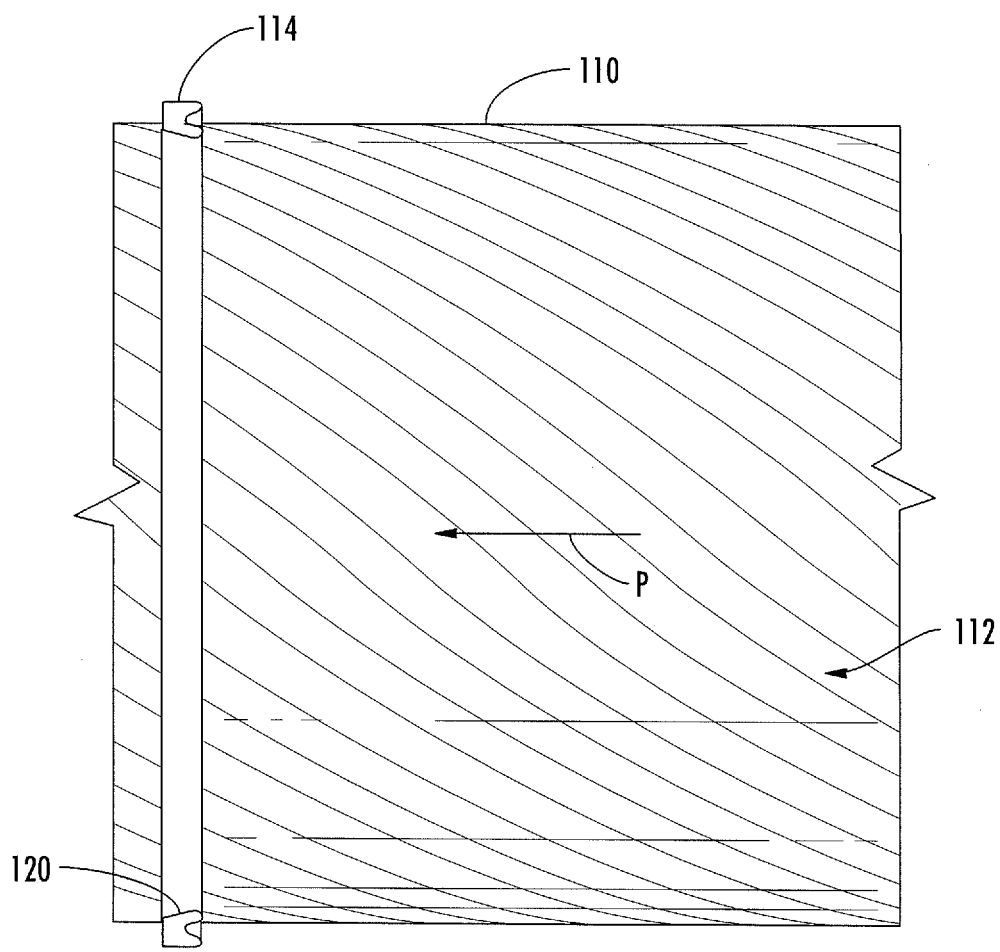
FIG. 8 is a schematic partial cross-sectional view of a portion of a housing of an embodiment of an apparatus according to the present subject matter.

Movement of pistons 84, 86 can result in a seal becoming relaxed, for example, during a screen change. For example, if a cross bore, such as a filter screen cavity, crosses over the seal, the extrusion gap principle can be lost and the seal no longer has a surface to ride against to keep the seal in position. Thereby, the seal is allowed to relax. When the seal is relaxed, it is allowed to protrude into the housing or bore as shown in FIG. 8 which shows housing 110, having a bore, generally designated 112, therein for receiving a piston (not shown). As shown in FIG. 8, the piston has been removed from bore 112 or moved to a position within bore 112 where a groove 114 defined within housing 110 is exposed. Groove 114 can be a circular groove that runs orthogonal to bore 112. A U-seal 120 can be placed or seated within groove 114 in housing 110 in the manner shown in FIG. 8. Using a seal such as U-seals 10, 40, 60 described above can help prevent early failure of the respective seal. For example, lead-in chamfers on U-seals 10 and 60 can prevent damage by the re-entry of the piston or more importantly the edge of the cross bore.

To replace the seal in, for example, a filtration apparatus 80 shown in FIG. 7, maintenance can be performed under depressurized conditions with the guards and plates removed using standard procedures. The hydraulic cylinders can be retracted and screen pistons can be moved until the U-seal is exposed. The used and worn U-seal in both the top and bottom piston housing can be removed and a new U-seal can be inserted. The same can be repeated on the other side of the piston and housing. As shown in FIG. 8, a new U-seal 120 can be placed in housing 110 in groove 114. When placing U-seal 120 in groove 112 of housing 110, the U-shaped side of seal 120 should face in towards the piston and the direction of pressure P as shown in FIG. 8. Bearing grease can be used to coat the seals for easier installation. If a seal cartridge is used with the filtration apparatus, the U-seal therein can be installed or replaced in a similar manner.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A seal for use in an apparatus to prevent leakage of fluids from the apparatus, the seal comprising:
   an integral annular body defining a space therebetween with an axis within the space and having an outer surface and an inner surface, the annular body comprising:
   a center base forming a first end of the annular body;
   an inner arm extending outward from the center base at an angle such that the inner arm extends inward toward the axis within the space defined by the annular body;
   an outer arm extending outward from the center base at an angle such that the outer arm extends outward away from the axis within the space defined by the annular body;
   a cavity formed between the inner arm and the outer arm that extends to a trough formed by the center base, the cavity comprising a base cavity section and a neck cavity section with the neck cavity section forming the opening at the second end of the annular body and the neck cavity section comprising a width as measured between the inner arm and the outer arm that is less than a width of the base cavity section as measured between the inner arm and the outer arm; and
   the inner arm and the outer arm having outer ends that form a second end of the annular body with the cavity having an opening at the second end, the outer end of the inner arm having a lead-in chamfer on the inner surface at the second end of the annular body and the outer end of the outer arm having a lead-in chamfer on the outer surface at the second end of the annular body.

2. The seal according to claim 1, wherein the center base comprises chamfer-ends on the inner and outer surfaces at the first end of the annular body.

3. The seal according to claim 1, wherein the inner arm and the outer arm are offset from each other.

4. The seal according, to claim 3, wherein an outer width of the annular body as measured from the first end to the second end at the outer end of the outer arm is larger than an inner width of the annular body as measured from the first end to the second end at the outer end of the inner arm.

5. The seal according to claim 1, wherein an inner measured length of the inner arm is shorter than an inner measured length of the outer arm as measured from the trough of the cavity to the outer ends of the respective inner and outer arms.

6. The seal according to claim 1, wherein the inner surface and the outer surface of the annular body are angled inward on the center base as seen in a direction from the second end towards the first end of the annular body.

7. The seal according to claim 6, wherein an angle of convergence of the inner surface and the outer surface on the center base as seen in a direction from the second end towards the first end of the annular body is less than an angle of divergence of the inner surface and the outer surface on the inner arm and the outer arm as seen in a direction from the first end towards the second end of the annular body.

8. The seal according to claim 1, wherein the inner arm and the outer arm are thicker at the respective outer ends that form the neck cavity section than portions of the inner arm and the outer arm that form the base cavity section.

9. The seal according to claim 1, wherein a bottom of the base cavity section is formed by the trough at the center base.

10. The seal according to claim 1, wherein the base cavity section comprises a substantially circular cross-section.

11. The seal according to claim 1, wherein the inner arm and the outer arm comprise the same measured length as measured from the trough of the cavity to the outer ends of the respective inner and outer arms.

12. The seal according to claim 11, wherein an outer width of the annular body as measured from the first end to the second end at the outer end of the outer arm is the same as an inner width of the annular body as measured from the first end to the second end at the outer end of the inner arm.

13. The seal according to claim 1, wherein the annular body comprises approximately 0.030 inches (0.762 mm) of pre-energized compression interference.

14. The seal according to claim 1, wherein the annular body comprises a plastic material.

15. The seal according to claim 1, wherein the annular body comprises at least one of a polyurethane, a polyethylene, a polytetrafluoroethylene (PTFE), a synthetic rubber or a fluoropolymer elastomer.

16. A seal for use in an apparatus to prevent leakage of fluids from the apparatus, the seal comprising:
   an integral annular body defining a space therebetween with an axis within the space and having an outer surface and an inner surface, the annular body comprising:
      a center base forming a first end of the annular body;
      an inner arm extending outward from the center base at an angle such that the inner arm extends inward toward the axis within the space defined by the annular body;
      an outer arm extending outward from the center base at an angle such that the outer arm extends outward away from the axis within the space defined by the annular body;
      the inner arm and the outer arm having outer ends that form a second end of the annular body; and
      a cavity formed between the inner arm and the outer arm that extends to a trough formed by the center base, the cavity comprising a base cavity section and a neck cavity section with the neck cavity section forming an opening at the second end of the annular body between the outer ends of the inner arm and the outer arm, wherein the neck cavity section comprises a width as measured between the inner arm and the outer arm that is less than a width of the base cavity section as measured between the inner arm and the outer arm.

17. The seal according to claim 16, wherein the center base comprises chamfer-ends on the inner and outer surfaces at the first end of the annular body.

18. The seal according to claim 16, wherein the inner surface and the outer surface of the annular body are angled inward on the center base as seen in a direction from the second end towards the first end of the annular body.

19. The seal according to claim 18, wherein an angle of convergence of the inner surface and the outer surface on the center base as seen in a direction from the second end towards the first end of the annular body is less than an angle of divergence of the inner surface and the outer surface on the inner arm and the outer arm as seen in a direction from the first end towards the second end of the annular body.

20. The seal according to claim 16, wherein the outer end of the inner arm has a lead-in chamfer on the inner surface at the second end of the annular body and the outer end of the outer arm has a lead-in chamfer on the outer surface at the second end of the annular body.

21. The seal according to claim 16, wherein the inner arm and the outer arm are thicker at the respective outer ends that form the neck cavity section than portions of the inner arm and the outer arm that form the base cavity section.

22. The seal according to claim 16, wherein a bottom of the base cavity section is formed by the trough at the center base.

23. The seal according to claim 16, wherein the base cavity section comprises a substantially circular cross-section.

24. The seal according to claim 16, wherein the inner arm and the outer arm comprise the same measured length as measured from the trough of the cavity to the outer ends of the respective inner and outer arms.

25. The seal according to claim 24, wherein an outer width of the annular body as measured from the first end to the second end at the outer end of the outer arm is the same as an inner width of the annular body as measured from the first end to the second end at the outer end of the inner arm.

26. The seal according to claim 16, wherein the annular body comprises approximately 0.030 inches (0.762 mm) of pre-energized compression interference.

27. The seal according to claim 16, wherein the annular body comprises a plastic material.

28. The seal according to claim 16, wherein the annular body comprises at least one of a polyurethane, a polyethylene, a polytetrafluoroethylene (PTFE), a synthetic rubber or a fluoropolymer elastomer.

29. An apparatus for processing fluids, the apparatus comprising:
   a housing with a bore therethrough;
   a piston positionable within the bore in the housing, the piston being movable within the bore of the housing; and
   a seal positionable within the bore of the housing between the housing and the piston, the seal comprising:
      an integral annular body defining a space therebetween with an axis within the space and having an outer surface and an inner surface, the annular body comprising:
         a center base forming a first end of the annular body;
         an inner arm extending outward from the center base at an angle such that the inner arm extends inward toward the axis within the space defined by the annular body;
         an outer arm extending outward from the center base at an angle such that the outer arm extends outward away from the axis within the space defined by the annular body;
         a cavity formed between the inner arm and the outer arm that extends to a trough formed by the center base, the cavity comprising a base cavity section and a neck cavity section with the neck cavity section forming the opening at the second end of the annular body and the neck cavity section comprising a width as measured between the inner arm and the outer arm that is less than a width of the base cavity section as measured between the inner arm and the outer arm; and
         the inner arm and the outer arm having outer ends that form a second end of the annular body with the cavity having an opening at the second end, the outer end of the inner arm having a lead-in chamfer on the inner surface at the second end of the annular body and the outer end of the outer arm having a lead-in chamfer on the outer surface at the second end of the annular body.

30. The apparatus according to claim 29, wherein the housing further defines a circular groove that runs orthogonal to the bore, the seal being at least partially seated in the groove upon installation of the seal.

31. The apparatus according to claim 29, wherein the piston forms a cross bore therethrough.

32. The apparatus according to claim 31, wherein the cross bore comprises a large entrance bore and a small outlet bore, the large entrance bore comprising a compound radius chamfer leading to an outer surface of the piston to keep the seal inside of a groove in the housing.

33. The apparatus according to claim 29, wherein a tight clearance is formed between the piston and the bore to create a small radial extrusion gap which facilitates the sealing of the fluid within the apparatus even at low pressures.

34. The apparatus according to claim 33, wherein the radial extrusion gap is about 0.0002 inches.

35. The apparatus according to claim 29, wherein the inner arm and the outer arm of the annular body of the seal are offset from each other.

36. The apparatus according to claim 35, wherein an outer width of the annular body as measured from the first end to the second end at the outer end of the outer arm is larger than an inner width of the annular body as measured from the first end to the second end at the outer end of the inner arm.

37. The apparatus according to claim 35, wherein an inner measured length of the inner arm is shorter than an inner measured length of the outer arm as measured from the trough of the cavity to the outer ends of the respective inner and outer arms.

38. The apparatus according to claim 29, wherein the inner arm and the outer arm are thicker at the respective outer ends that form the neck cavity section than portions of the inner arm and the outer arm that form the base cavity section.

39. An apparatus for processing fluids, the apparatus comprising:
- a housing with a bore therethrough;
- a piston positionable within the bore in the housing, the piston being movable within the bore of the housing; and
- a seal positionable within the bore of the housing between the housing and the piston, the seal comprising:
    - an integral annular body defining a space therebetween with an axis within the space and having an outer surface and an inner surface, the annular body comprising:
    - a center base forming a first end of the annular body;
    - an inner arm extending outward from the center base at an angle such that the inner arm extends inward toward the axis within the space defined by the annular body;
    - an outer arm extending outward from the center base at an angle such that the outer arm extends outward away from the axis within the space defined by the annular body;
    - the inner arm and the outer arm having outer ends that form a second end of the annular body; and
    - a cavity formed between the inner arm and the outer arm that extends to a trough formed by the center base, the cavity comprising a base cavity section and a neck cavity section with the neck cavity section forming an opening at the second end of the annular body between the outer ends of the inner arm and the outer arm, wherein the neck cavity section comprises a width as measured between the inner arm and the outer arm that is less than a width of the base cavity section as measured between the inner arm and the outer arm.

40. The apparatus according to claim 39, wherein the housing further defines a circular groove that runs orthogonal to the bore, the seal being at least partially seated in the groove upon installation of the seal.

41. The apparatus according to claim 39, wherein the piston forms a cross bore therethrough.

42. The apparatus according to claim 41, wherein the cross bore comprises a large entrance bore and a small outlet bore, the large entrance bore comprising a compound radius chamfer leading to an outer surface of the piston to keep the seal inside of a groove in the housing.

43. The apparatus according to claim 39, wherein a tight clearance is formed between the piston and the bore to create a small radial extrusion gap which facilitates the sealing of the fluid within the apparatus even at low pressures.

44. The apparatus according to claim 43, wherein the radial extrusion gap is about 0.0002 inches.

45. The apparatus according to claim 39, wherein the outer end of the inner arm of the seal comprises a lead-in chamfer on the inner surface at the second end of the annular body and the outer end of the outer arm having a lead-in chamfer on the outer surface at the second end of the annular body.

46. The seal according to claim 39, wherein the inner arm and the outer arm are thicker at the respective outer ends that form the neck cavity section than portions of the inner arm and the outer arm that form the base cavity section.

\* \* \* \* \*